US012077973B2

(12) United States Patent
Burnett

(10) Patent No.: US 12,077,973 B2
(45) Date of Patent: Sep. 3, 2024

(54) MONOPOLE EQUIPMENT MOUNTING DEVICES AND METHODS

(71) Applicant: Sabre Communications Corporation, Sioux City, IA (US)

(72) Inventor: Michael James Burnett, Sioux City, IA (US)

(73) Assignee: Sabre Communications Corporation, Sioux City, IA (US)

( * ) Notice: Subject to any disclaimer, the term of this patent is extended or adjusted under 35 U.S.C. 154(b) by 211 days.

(21) Appl. No.: 17/539,135

(22) Filed: Nov. 30, 2021

(65) Prior Publication Data

US 2023/0167648 A1 Jun. 1, 2023

(51) Int. Cl.

*H01Q 1/12* (2006.01)
*E04C 3/02* (2006.01)
*E04G 3/24* (2006.01)

(52) U.S. Cl.

CPC .................. *E04G 3/24* (2013.01); *E04C 3/02* (2013.01); *H01Q 1/1207* (2013.01); *H01Q 1/1242* (2013.01)

(58) Field of Classification Search

CPC ........................... H01Q 1/1242; H01Q 1/1207
See application file for complete search history.

(56) References Cited

U.S. PATENT DOCUMENTS

| | | | | |
|---|---|---|---|---|
| 7,086,207 | B2 | 8/2006 | Piburn et al. | |
| 9,812,762 | B2 | 11/2017 | Skrepcinski et al. | |
| 10,122,064 | B2 | 11/2018 | Skrepcinski et al. | |
| 2006/0279472 | A1 | 12/2006 | Piburn et al. | |
| 2011/0279347 | A1* | 11/2011 | Pass | E04G 3/243 343/890 |
| 2017/0211745 | A1* | 7/2017 | Alban | H01Q 1/1207 |
| 2019/0267696 | A1* | 8/2019 | Stekr | H01Q 1/1207 |
| 2022/0085481 | A1* | 3/2022 | Severin | H01Q 1/1242 |

FOREIGN PATENT DOCUMENTS

FR 2822299 A1 * 9/2002 .......... H01Q 1/1207

* cited by examiner

*Primary Examiner* — Awat M Salih
(74) *Attorney, Agent, or Firm* — Schwegman Lundberg & Woessner, P.A.

(57) ABSTRACT

A mounting assembly can include or use a pole attachment mount, first, second, and third arms, respectively including proximal ends that are respectively couplable to the pole attachment mount, the proximal end of the second arm located between the proximal ends of the first and third arms, a first face member, coupled to a distal end of the first arm and coupled to a distal end of the second arm and a second face member, coupled to a distal end of the third arm and coupled to a distal end of the second arm. Multiple mounting assemblies can be attached to a pole such as to provide a mounting surface for communications equipment and orienting the same such as to cover multiple azimuths around the pole.

17 Claims, 3 Drawing Sheets

MONOPOLE EQUIPMENT MOUNTING DEVICES AND METHODS

TECHNICAL FIELD

This document pertains generally, but not by way of limitation, to communications equipment mounting devices such as for utility poles such as monopoles, such as for raised antenna implementations in the field.

BACKGROUND

Utility and communication poles can include monopoles that can be used to raise or support lights, antennas or other communications equipment, or other devices above the surface to which they are mounted. Fixtures can be mounted to the monopole, such as at an extended distance above the earth or other surface from which the monopole extends. A human worker may climb the monopole and work on the fixture. Equipment may be mounted to the monopole, such as by the worker standing on the fixture.

SUMMARY

The present inventors have recognized, among other things, that a problem to be solved can include securely mounting antennas or other communication equipment to a monopole or other vertical member so as to increase azimuthal flexibility of the antennas, without resorting to the complexity of requiring that a fully-circular platform or other antenna mounting structure be attached to the monopole or other vertical member.

It can be advantageous to fully utilize space available on the towers such as to support, e.g., several radio and antenna units. Larger and heavier antennas can be mounted to traditional monopole towers such as to help handle more wireless traffic. Larger antennas can require more support than some traditional mounts can provide. Also, the configuration, e.g., an angular direction, of the antenna on the mount can impact its effectiveness. As such, increasing the number of azimuths available for mounting antennas can be desirable. Because antennas are mounted on towers well above the ground, technicians working on the antennas and their mounts are working under challenging conditions. Therefore, a mount design that can reduce a difficulty of mounting, adjusting, raising, or servicing the mounts or antennas can be desirable.

This overview is intended to provide an overview of subject matter of the present patent application. It is not intended to provide an exclusive or exhaustive explanation of the invention. The detailed description is included to provide further information about the present patent application.

DETAILED DESCRIPTION

Figure 1A:
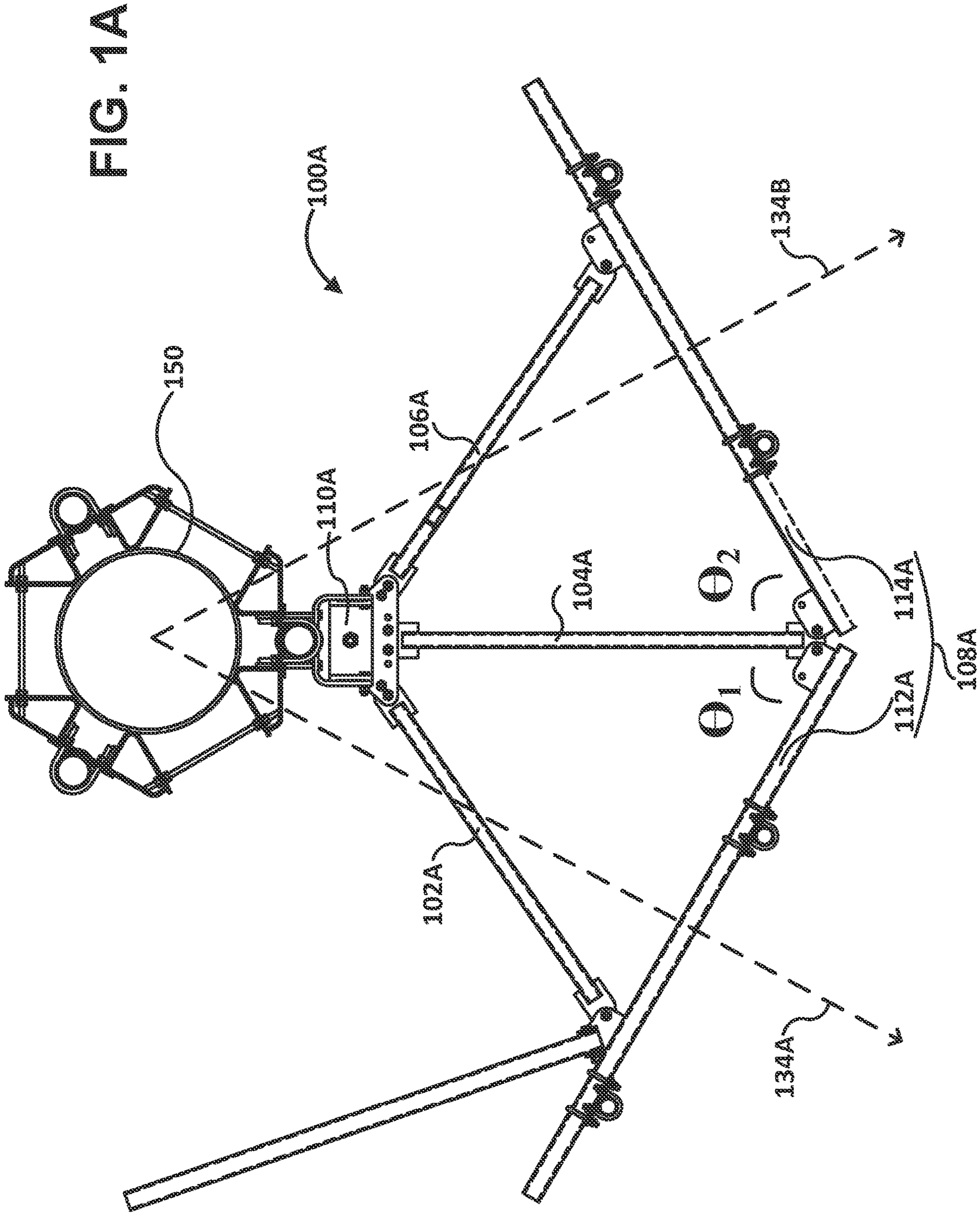
FIG. 1A depicts a top view of an example of the mounting assembly.

This document describes, among other things, a multi-sector system of split-face "V-boom style" mounting assemblies for improving the azimuthal directional functionality and ease of installation and servicing of monopole communications equipment. The present systems and methods can help permit increasing the number or directionality of antenna configurations that a telecommunications tower can accommodate.

Mounting systems can be used to mount communications equipment to a monopole telecommunications tower. For example, the tower can support equipment (e.g., power wires, telecommunication equipment or wires, or the like). In an example, a series of towers are arranged alongside a roadway and power transmission lines are strung along the series of utility poles. In another example, cellular device infrastructure (e.g., antennas, data processing equipment, or the like) can be coupled to the tower. The tower extends a distance from the mounting structure to a base to elevate the equipment so that the equipment is isolated from the ground surface, for example to provide a clear electromagnetic access path to a raised antenna or to allow vehicles or people to travel beneath the equipment without coming into contact with the equipment.

In one approach, a round or circular mounting assembly can be fixed or clamped to the tower. The round mounting assembly can permit communications equipment to be positioned at various azimuths located 360° around the monopole, and selective positioning antennas at the various azimuths can help optimize equipment function. Also, communications equipment can be occasionally re-configured or adjusted, e.g., radially around the round mounting assembly, while the assembly remains fixed to the monopole (i.e., without rotating the entire assembly). A challenge of round or circular mounting assemblies, however, is that they must either be 1) assembled on the ground and raised to the top position only of a pole 2) assembled in the air, e.g., where it can be arduous to fit pieces together.

In another approach, a plurality of mounting assemblies can be adjacently installed at various azimuths around the monopole to form a polygon. Here, each of the plurality of mounting assemblies can each define a sector of a collective multi-sector mounting system. An advantage of a multi-sector mounting system is that each sector can be assembled, equipment attached thereto on the ground, and the sectors can be individually raised and mounted around the monopole. Such individual raising and mounting of a sector permits more flexibility to raise the individual past an obstacle. Also, such a multi-sector mounting system, e.g., having three sectors forming a peripheral triangle, can be significantly easier to assemble and install than a round mounting assembly. A challenge of some multi-sector mounting systems, however, is that they can accommodate fewer equipment configurations than a round mounting assembly. Further, increasing the number of azimuths available for positioning antennas or other communication equipment with certain multi-sector mounting systems can involve adding more sectors. But this can complicate assembly, installation, and servicing of the mounting system and thus negate advantages of such an approach, as well as the likelihood that the multitude of sectors would not fit without encroaching on each other. This document, among other things, describes a multi-sector mounting system that can help allow for flexible configuration of communications equipment while helping retain an ease of assembly. In particular, this document describes a split-face "V-boom style" mounting assembly helpful for improving the functionality and ease of installation and servicing of monopole communications equipment.

Figure 1B:
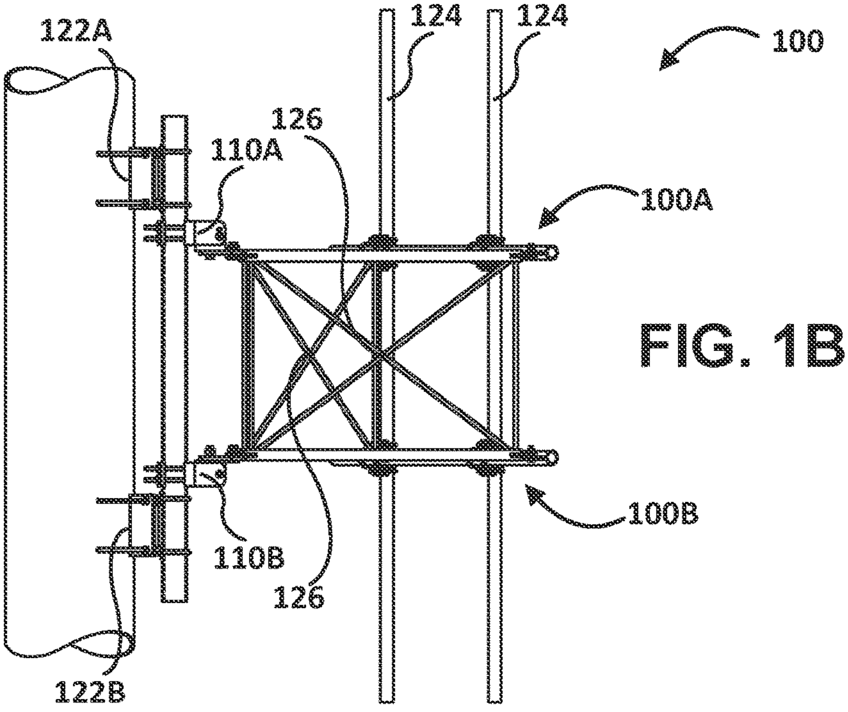
FIG. 1B depicts a side view of an example of a mounting assembly.
Figure 1C:
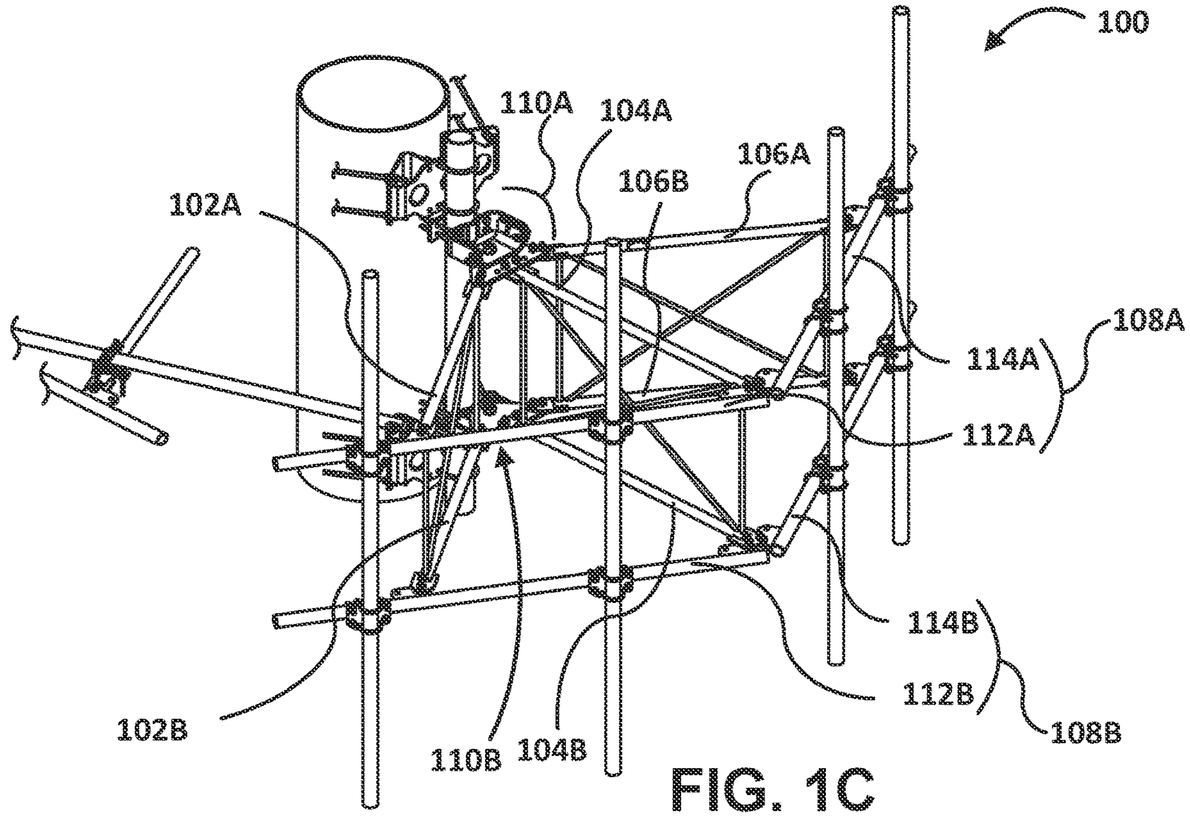
FIG. 1C depicts an isometric view of an example of a mounting assembly.

FIG. 1A, FIG. 1B, and FIG. 1C depict an example of a mounting assembly attached to a monopole. FIG. 1A depicts a top view of an example of the mounting assembly. An upper section 100A of a mounting assembly 100 can include or use a first upper arm 102A, a second upper arm 104A, a third upper arm 106A, a split-face upper rail 108A and an upper pole attachment mount 110A. While these components labeled "upper" are intended to be used in a structurally stable mounting structure sector together with similar components labeled "lower," this is preferred but not required. As such, a mounting assembly 100 can include parts of the upper section 100A without needing to include any corresponding parts of a lower section, or vice-versa.

In the top view in FIG. 1A, each of the first, second, and third upper arms 102A, 104A, & 106A can be attached at respective proximal ends to the upper pole attachment mount 110A. The proximal end of the second upper arm 104A can be located between (e.g., offset from) the proximal ends of the first and third upper arms 102A and 106A. The split-face upper rail 108A can be used as an exterior peripheral distal surface for mounting the antennas or other communications equipment, such as directly or via the vertical antenna mounting pipes 124 fastened thereto. The split-face upper rail 108A can include or use a first upper face member 112A and a second upper face member 114A individually joined to and jointly bisected by the second upper arm 104A at a distal end of the second upper arm 104A. Here, the distal end of the second upper arm 104A defines a hinged or other upper medial break point between the first upper face member 112A and the second upper face member 114A. This upper medial break point can allow the first upper face member 112A and the second upper face member 114A to each be non-orthogonally couplable to the second upper arm 104A—which can help increase the collective azimuthal directionality of antennas mounted via one of the individual first upper face member 112A or the second individual upper face member 114A. Stated differently, a first angle $\theta_1$ at a joint between the second upper arm 104A and the first upper face member 112A and a second angle $\theta_2$ at a joint between the second upper arm 104A and the second upper face member 114A can each be non-orthogonal angles. The first angle $\theta_1$ and the second angle $\theta_2$ can be acute angles. The first angle $\theta_1$ and the second angle $\theta_2$ can be angles between about 45 degrees and about 89 degrees. The first angle $\theta_1$ and the second angle $\theta_2$ can be angles between about 60 degrees and about 89 degrees. The first angle $\theta_1$ and the second angle $\theta_2$ can be angles between about 45 degrees and about 75 degrees. The first angle $\theta_1$ and the second angle $\theta_2$ can be angles between about 55 degrees and about 65 degrees. Also, the first upper face member 112A and the second upper face member 114A can be arranged an angle between about 110 degrees and about 130 degrees. Thus, as shown in FIG. 1A, the second upper arm 104A can extend distally outward from the monopole beyond a straight line defined between respective distal ends of the first upper arm 102A and the third upper arm 106A. Also, the upper medial break point can extend beyond a straight line defined between respective distal ends of the first upper arm 102A and the third upper arm 106A. In an example, the first, second, and third upper arms 102A, 104A, and 106A can extend from the upper pole attachment mount 110A at about the same distance. Particularly, the respective attachment points of the first upper face member 112A and the second upper face member 114A can be about equidistant from the upper pole attachment mount 110A. Here, the first, second, and third upper arms 102A, 104A, and 106A can each be about the equal in length. (the middle arm is longer in length to create the split in the faces)

In an example, the first upper arm 102A, the second upper arm 104A, and the first upper face member 112A are each connected at respective lateral ends such as to form a first triangle. Also, the third upper arm 106A, the second upper arm 104A, and the second upper face member 114A can each be connected at respective lateral ends such as to form a second triangle. The first triangle or the second triangle can be a substantially isosceles triangle or a substantially equilateral triangle. Herein, "substantially isosceles" and "substantially equilateral" refer to a general shape formed by an arrangement of the arms and face members, such as allowing for a linear or other offset between the attachment points of the proximal ends of the first, second, and third upper arms 102A, 104A, and 106A from one another.

The split-face upper rail 108A allows for mounting of antennas or communications equipment at the first upper face member 112A and the second upper face member 114A, the angular orientation of the two being at two different azimuths. Thus, equipment, can be mounted, facing outward on respective exterior distal peripheral rails approximately equidistant from the monopole, at two different azimuths, a first azimuth 134A and a second azimuth 134B, using a single mounting assembly. The two different azimuths 134A and 134B can have an angular difference between one another ranging between about 50° and about 70°. This arrangement also allows antennas to be turned to create more flexibility in orienting azimuths.

The upper pole attachment mount 110A can include or use an upper proximal portion pivotably attached to an upper distal portion, and the first, second, and third upper arms 102A, 104A, and 106A can be attached to the upper distal portion of the upper pole attachment mount 110A. This can help permit some adjustment of components extending distally outward from the upper distal portion of the upper pole attachment mount 110A, which, in turn, can help increase flexibility in obtaining a desired azimuthal orientation of antennas mounted to this sector via the pivotable upper pole attachment mount 110A.

While the description of FIG. 1A has focused on certain "upper components" of the mounting assembly, as mentioned, it is preferred that these "upper components" be used together with corresponding lower components, such as shown in FIGS. 1B and 1C. FIG. 1B depicts a side view of an example of a mounting assembly 100. In an example, the mounting assembly can include or use an upper section 100A and a similar corresponding lower section 100B. The upper section 100A and the lower section 100B can be respectively attached to the upper pole attachment mount 110A and a lower pole attachment mount 110B. The upper section 100A and the lower section 100B can be attached to each other such as can include bracing 126 located therebetween. In an example as depicted in FIG. 1B, the bracing 126 can be cross-bracing. The bracing can extend between respective proximal and distal ends of any of the upper and lower arms 102A, 104A, 106A, 102B, 104B, or 106B. Also, vertical antenna mounting pipes 124 can extend between the split-face lower rail 108B and the corresponding split-face upper rail 108A, such as by being bolted thereto, such as using U-bolts, or otherwise.

FIG. 1C depicts an isometric view of an example of a mounting assembly 100. The upper section 100A can include the first, second, and third upper arms 102A, 104A, & 106A, the split-face upper rail 108A, and the upper pole attachment mount 110A. The lower section 100B can be arranged similar to that previously described with respect to the upper section 100A. The lower section 100B can include first, second, and third lower arms 102B, 104B, & 106B can be attached at respective proximal ends to the lower pole attachment mount 110B. The proximal end of the second lower arm 104B can be located between (e.g., offset from) the proximal ends of the first and third lower arms 102B and 106B. The split-face lower rail 108B can be used as an exterior peripheral distal surface for mounting the antennas or other communications equipment, such as directly or via the vertical antenna mounting pipes 124 fastened thereto. The split-face lower rail 108B can include or use a first lower face member 112B and a second lower face member 114B individually joined to and jointly bisected by the second lower arm 104B at a distal end of the second lower arm 104B. Here, the distal end of the second lower arm 104B defines a hinged or other lower medial break point between the first lower face member 112B and the second lower face member 114B. This lower medial break point can allow the first lower face member 112B and the second lower face member 114B to each be non-orthogonally couplable to the second lower arm 104B—which can help increase the collective azimuthal directionality of antennas mounted via one of the individual first lower face member 112B or the individual second lower face member 114. Stated differently, a third angle at a joint between the second lower arm 104B and the first lower face member 112B and a fourth angle at a joint between the second lower arm 104B and the second lower face member 114B can each be non-orthogonal angles. The third angle and the fourth angle can be acute angles. The third angle and the fourth angle can be angles between about 45 degrees and about 89 degrees. The third angle and the fourth angle can be angles between about 60 degrees and about 89 degrees. The third angle and the fourth angle can be angles between about 45 degrees and about 75 degrees. The third angle and the fourth angle can be angles between about 55 degrees and about 65 degrees. Also, the first lower face member 112B and the second lower face member 114B can be arranged an angle between about 110 degrees and about 130 degrees. Thus, as shown in FIG. 1C, the second lower arm 104B can extend distally outward from the monopole beyond a straight line defined between respective distal ends of the first lower arm 102B and the third lower arm 106B. Also, the lower medial break point can extend beyond a straight line defined between respective distal ends of the first lower arm 102B and the third lower arm 106B. In an example, the first, second, and third lower arms 102B, 104B, and 106B can extend from the lower pole attachment mount 110B at about the same distance. Particularly, the respective attachment points of the first lower face member 112B and the second lower face member 114B can be about equidistant from the lower pole attachment mount 110B. Here, the first, second, and third lower arms 102B, 104B, and 106B can each be about the equal in length.

In an example, the first lower arm 102B, the second lower arm 104B, and the first lower face member 112B are each connected at respective lateral ends such as to form a third triangle. Also, the third lower arm 106B, the second lower arm 104B, and the second lower face member 114B can each be connected at respective lateral ends such as to form a fourth triangle. The third triangle or the fourth triangle can be a substantially isosceles triangle or a substantially equilateral triangle. Herein, "substantially isosceles" and "substantially equilateral" refer to a general shape formed by an arrangement of the arms and face members, such as allowing for a linear or other offset between the attachment points of the proximal ends of the first, second, and third lower arms 102B, 104B, and 106B from one another.

The split-face lower rail 108B allows for mounting of antennas or communications equipment at the first lower face member 112B and the second lower face member 114B, the angular orientation of the two being at two different azimuths. Thus, equipment can be mounted, facing outward on respective exterior distal peripheral rails approximately equidistant from the monopole, at two different azimuths using a single mounting assembly. The two different azimuths can have an angular difference between one another ranging between about 50° and about 70°.

The lower pole attachment mount 110B can include or use a lower proximal portion pivotably attached to a lower distal portion, and the first, second, and third lower arms 102AB, 104B, and 106B can be attached to the lower distal portion of the lower pole attachment mount 110B. This can help permit some adjustment of components extending distally outward from the lower distal portion of the lower pole attachment mount 110B, which, in turn, can help increase flexibility in obtaining a desired azimuthal orientation of antennas mounted to this sector via the pivotable lower pole attachment mount 110B.

In an example, the upper section 100A and the lower section 100B can be arranged together as an assembly. The arrangement of both the upper section 100A and lower section 100B together, such as via the bracing 126, can provide structural integrity and can allow for mounting of more/heavier equipment than certain mounts lacking two full upper and lower sections and attaching to the monopole at two locations. The increased structural integrity and support can allow for mounting of the equipment in a manner that can help the equipment withstand wind, vibration or oscillation of the monopole, or other environmental factors affecting the mounting assembly 100.

One or more mounting assemblies 100 can be attached, clamped, or coupled to a monopole such as via an upper bracket 122A or the lower bracket 122B (as depicted in FIG. 1B). The upper bracket 122A and lower bracket 122B can each include a collar, such as a tri-collar bracket assembly that can accommodate a 10-inch through 40-inch monopole extending therethrough. In an example, any number (e.g., two or three) of mounting assemblies can be mounted to the upper mounting bracket 122A or the lower mounting bracket 122B. While mounting assemblies and systems herein are generally described with respect to monopole towers, the same can be used with other types of telecommunications towers, masts, or poles. As such, suitable brackets corresponding with the different types of telecommunications structures can be used such as to provide attachment locations for each mounting assembly in a similar fashion as depicted in FIG. 1B with respect to bracket 122A and bracket 122B.

Figure 2:
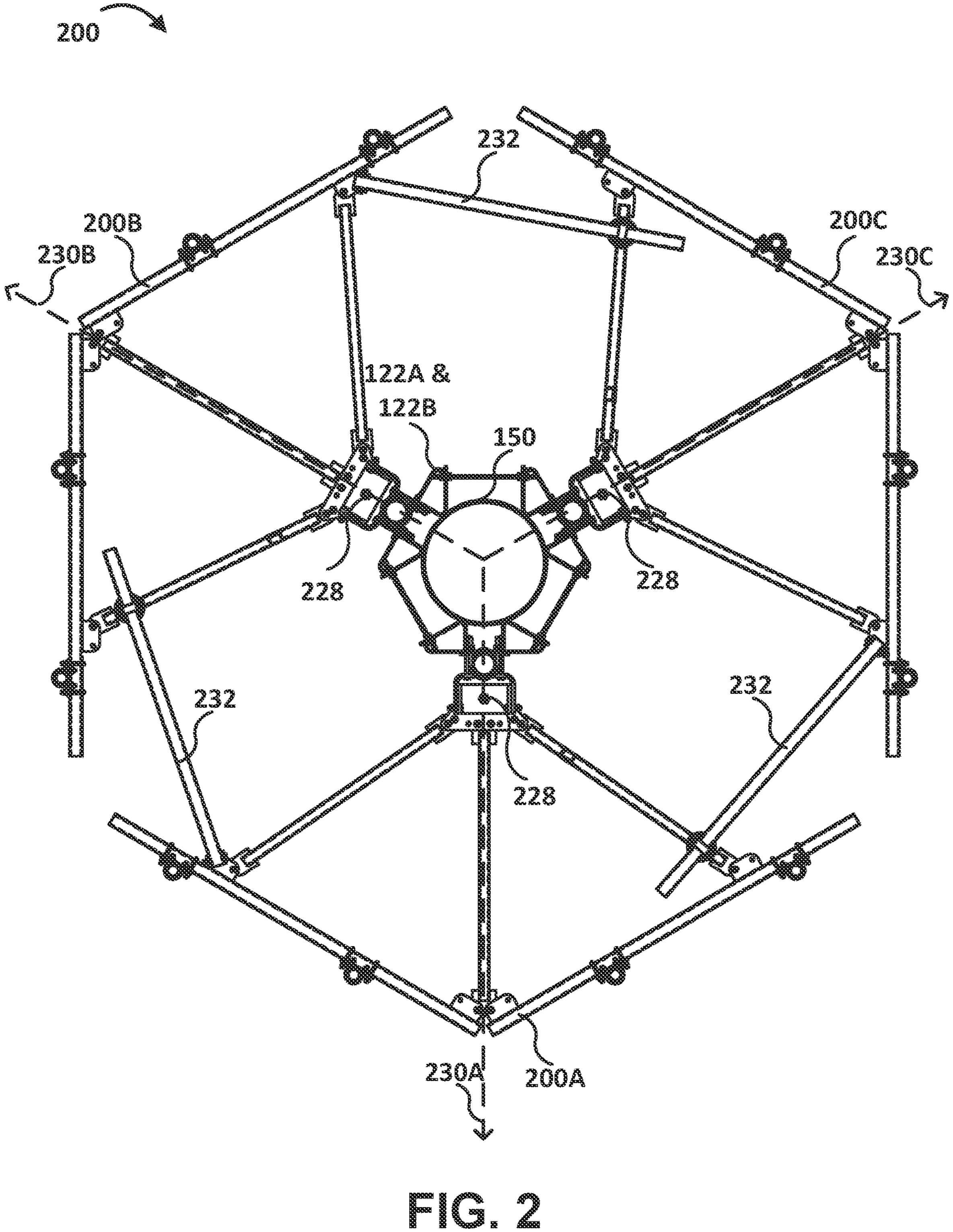
FIG. 2 depicts a mounting system including multiple mounting assemblies attached adjacent to one another around a monopole.

FIG. 2 depicts a mounting system 200 including multiple mounting assemblies 200A, 200B, and 200C attached adjacent to one another around a monopole. The mounting assemblies 200A, 200B, and 200C are each substantially similar to mounting assembly 100 of the example of FIG. 1A, FIG. 1B, and FIG. 1C. The components, structures, configuration, functions, etc. of mounting assemblies 200A, 200B, and 200C can therefore be the same as or substantially similar to that described in detail above with reference to mounting assembly 100. In an example, any number of mounting assemblies can be fixed to the monopole 150, such as fixed to the upper mounting bracket 122A or the lower mounting bracket 122B. In an example, the number of mounting assemblies included in the mounting system 200 can be three or less. Each of the mounting assemblies can be constructed or assembled on the ground and can be raised independently of one another for fixing to the monopole such as at the bracket 122A or the bracket 122B. The respective upper pole attachment mount and the lower pole attachment mount of each of the mounting assemblies 200A, 200B, and 200C can be respectively coupled to the upper mounting bracket 122A and the lower mounting bracket 122B. Each of the mounting assemblies 200A, 200B, and 200C can rotate independently from one another such as by rotating about pivot points 228 of each of their respective upper and lower pole attachment mounts. Each of the mounting assemblies 200A, 200B, and 200C can rotate independently from one another such that azimuths 230A, 230B, and 230C at the medial break point of each respective mounting assembly can range from about 90° to about 180° apart from one another. Two mounting assemblies can be tied to each other such as by a tie back 232. The tie backs 232 can restrain rotation of the mounting assemblies 200A, 200B, and 200C about their respective pivot points 228. In an example, a first arm of a mounting assembly (e.g., mounting assembly 200A) can be bound to a third arm of an adjacent mounting assembly (e.g., mounting assembly 200B) via the tieback 232. In an example, the tiebacks 232 can be loosened or otherwise uncoupled and an angular orientation of each of the mounting assemblies 200A, 200B, and 200C can be adjusted. Coupling the tiebacks 232 can preserve an adjustment of the angular orientation of the mounting assemblies 200A, 200B, and 200C.

In an example, wherein the mounting assemblies 200A, 200B, and 200C can arranged to substantially form a convex polygon around the monopole. Herein, "substantially form a convex polygon" means that the respective split-face upper rails (or the split face lower rails) of each of the mounting assemblies 200A, 200B, and 200C formed a general shape of a convex polygon, such as allowing for an offset between respective attachment points and an offset between respective split-face rails from one another. The convex polygon can be a hexagon. In an example, the mounting assemblies 200A, 200B, and 200C can be adjusted about their respective pivot points 228 such that the vertices of the hexagon are rotatable to collectively travel around an entire circumscribed circle of the hexagon while all pole attachment mounts and mounting brackets 122A and 122B remain in a fixed position relative to the monopole 150. Stated differently, the vertices hexagon can effectively rotate to spin all possible different hexagonal orientations 360° around the monopole without needing to be unclamped therefrom at the mounting brackets 122A and 122B. The mounting assemblies 200A, 200B, and 200C can be adjusted about their respective pivot points 228 such that interior angles of the hexagon can each be modified between about 110° and about 114°.

EXAMPLES AND NOTES

Example 1 is a mounting system for mounting communication equipment to a monopole tower, the system comprising: a first mounting assembly comprising: an upper pole attachment mount; a lower pole attachment mount; first, second, and third upper arms, respectively including proximal ends that are respectively couplable to the upper pole attachment mount, the proximal end of the second upper arm located between the proximal ends of the first and third upper arms; first, second, and third lower arms, respectively including proximal ends that are respectively couplable to the lower pole attachment mount, the proximal end of the second lower arm located between the proximal ends of the first and third lower arms; a first upper face member, coupled to respective distal ends of the first and second upper arms; a second upper face member, coupled to respective distal ends of the second and third upper arms; a first lower face member, coupled to respective distal ends of the first and second lower arms; and a second lower face member, coupled to respective distal ends of the second and third lower arms.

In Example 2, the subject matter of Example 1, wherein: the distal end of the second upper arm defines an upper medial break point between the first upper face member and the second upper face member; the upper medial break point extends distally beyond a first straight line defined between the respective distal ends of the first upper arm and the third upper arm; the distal end of the second lower arm defines a lower medial break point between the first lower face member and the second lower face member; and the lower medial break point extends distally beyond a second straight line defined between the respective distal ends of the first lower arm and the third lower arm.

In Example 3, the subject matter of any of Examples 1-2, wherein: the first upper arm, the second upper arm, and the first upper face member are arranged to form a substantially isosceles triangle; the third upper arm, the second upper arm, and the second upper face member are arranged to form a substantially isosceles triangle; the first lower arm, the second lower arm, and the first lower face member are arranged to form a substantially isosceles triangle; and the third lower arm, the second lower arm, and the second lower face member are arranged to form a substantially isosceles triangle.

In Example 4, the subject matter of any of Examples 2-3, wherein: the first upper arm, the second upper arm, and the first upper face member are arranged to form a substantially equilateral triangle; the third upper arm, the second upper arm, and the second upper face member are arranged to form a substantially equilateral triangle; the first lower arm, the second lower arm, and the first lower face member are arranged to form a substantially equilateral triangle and the third lower arm, the second lower arm, and the second lower face member are arranged to form a substantially equilateral triangle.

In Example 5, the subject matter of any of Examples 1-4, wherein the first upper arm, the second upper arm, the third upper arm, the first lower arm, the second lower arm, and the third lower arm are all substantially equal in length.

In Example 6, the subject matter of any of Examples 1-5, wherein: the second upper arm and the first upper face member are joined at a non-orthogonal angle; the second upper arm and the second upper face member are joined at a non-orthogonal angle; the second lower arm and the first lower face member are joined at a non-orthogonal angle; and the second lower arm and the second lower face member are joined at a non-orthogonal angle.

In Example 7, the subject matter of Example 6, wherein: the second upper arm and the first upper face member are joined at an acute angle; the second upper arm and the second upper face member are joined at an acute angle; the second lower arm and the first lower face member are joined at an acute angle; and the second lower arm and the second lower face member are joined at an acute angle.

In Example 8, the subject matter of Example 7, wherein: the second upper arm and the first upper face member are joined at an acute angle between 60 degrees and 89 degrees; the second upper arm and the second upper face member are joined at an acute angle between 60 degrees and 89 degrees; the second lower arm and the first lower face member are joined at an acute angle between 60 degrees and 89 degrees;

and the second lower arm and the second lower face member are joined at an acute angle between 60 degrees and 89 degrees.

In Example 9, the subject matter of any of Examples 1-8, wherein the first upper face member and the second upper face member are arranged an angle between 110 degrees and 130 degrees; and the first lower face member and the second lower face member are arranged an angle between 55 degrees and 65 degrees.

In Example 10, the subject matter of any of Examples 1-9, wherein: the upper pole attachment mount includes an upper proximal portion pivotably attached to an upper distal portion, wherein the first, second, and third upper arms are attached to the upper distal portion of the upper pole attachment mount; and the lower pole attachment mount includes a lower proximal portion pivotably attached to a lower distal portion, wherein the first, second, and third lower arms are attached to the lower distal portion of the lower pole attachment mount.

Example 11 is a method of mounting to a monopole tower, the method comprising: obtaining or providing or assembling an antenna mounting assembly of a multi-sector system, the antenna mounting assembly including an attachment mount to secure the antenna mounting assembly to the monopole, and including a peripheral portion having a medial break between two non-aligned face portions; locating a plurality of the antenna mounting assemblies secured to the monopole, such that the plurality of mounting assemblies are arranged to substantially form a peripheral convex polygon around the monopole.

In Example 12, the subject matter of Example 11, wherein the plurality of antenna mounting assemblies consists of first, second, and third mounting assemblies and the peripheral convex polygon is a hexagon.

In Example 13, the subject matter of Example 12, wherein the first, second, and third mounting antenna assemblies are pivotably adjustable such that vertices of the hexagon are rotatable to collectively travel around an entire circumscribed circle of the hexagon while the attachment mount remains at a fixed position on the monopole.

In Example 14, the subject matter of any of Examples 12-13, wherein the first, second, and third antenna mounting assemblies are pivotably adjustable such that interior angles of the hexagon can each be modified between 110° and 140°.

Example 15 is a mounting system for mounting communication equipment to a monopole tower, the system comprising: a mounting assembly comprising: a pole attachment mount; first, second, and third arms, respectively including proximal ends that are respectively couplable to the pole attachment mount, the proximal end of the second arm located between the proximal ends of the first and third arms; a first face member, coupled to a distal end of the first arm and non-orthogonally coupled to a distal end of the second arm; and a second face member, coupled to a distal end of the third arm and non-orthogonally coupled to a distal end of the second arm.

In Example 16, the subject matter of Example 15, wherein: the distal end of the second arm defines a medial break point between the first face member and the second face member; and the medial break point extends distally beyond a first straight line defined between the respective distal ends of the first arm and the third arm.

In Example 17, the subject matter of Example 16, wherein: the first arm, the second arm, and the first face member are arranged to form a substantially isosceles triangle; and the third arm, the second arm, and the second face member are arranged to form a substantially isosceles triangle.

In Example 18, the subject matter of any of Examples 16-17, wherein: the first arm, the second arm, and the first face member are arranged to form a substantially equilateral triangle; and the third arm, the second arm, and the second face member are arranged to form a substantially equilateral triangle.

In Example 19, the subject matter of any of Examples 15-18, wherein: the second arm and the first face member are joined at an acute angle; and the second arm and the second face member are joined at an acute angle.

In Example 20, the subject matter of any of Examples 15-19, wherein: the pole attachment mount includes a proximal portion pivotably attached to a distal portion, wherein the first, second, and third arms are attached to the distal portion of the pole attachment mount.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations.

What is claimed is:

1. A mounting system for mounting communication equipment to a monopole tower, the system comprising:

a first mounting assembly comprising:

an upper pole attachment mount;

a lower pole attachment mount;

first, second, and third upper arms, respectively including proximal ends that are respectively couplable to the upper pole attachment mount, the proximal end of the second upper arm located between the proximal ends of the first and third upper arms;

first, second, and third lower arms, respectively including proximal ends that are respectively couplable to the lower pole attachment mount, the proximal end of the second lower arm located between the proximal ends of the first and third lower arms;

a first upper face member, non-orthogonally coupled to respective distal ends of the first and second upper arms;

a second upper face member, non-orthogonally coupled to respective distal ends of the second and third upper arms;

a first lower face member, non-orthogonally coupled to respective distal ends of the first and second lower arms; and a second lower face member, non-orthogonally coupled to respective distal ends of the second and third lower arms;

wherein the first and second upper face members establish a hinged upper medial break point at respective interfaces with the distal end of the second upper arm; and wherein the first and second lower face members establish a hinged upper medial break point at respective interfaces with the distal end of the second lower arm.

2. The mounting system of claim 1, wherein:

the distal end of the second upper arm bisects the first upper face member and the second upper face member at the hinged upper medial break point;

the hinged upper medial break point extends distally beyond a first straight line defined between the respective distal ends of the first upper arm and the third upper arm;

the distal end of the second lower arm bisects the first lower face member and the second lower face member at the hinged lower medial break point; and the hinged lower medial break point extends distally beyond a second straight line defined between the respective distal ends of the first lower arm and the third lower arm.

3. The mounting system of claim 2, wherein:

the first upper arm, the second upper arm, and the first upper face member are arranged to form a substantially equilateral triangle;

the third upper arm, the second upper arm, and the second upper face member are arranged to form a substantially equilateral triangle;

the first lower arm, the second lower arm, and the first lower face member are arranged to form a substantially equilateral triangle; and the third lower arm, the second lower arm, and the second lower face member are arranged to form a substantially equilateral triangle.

4. The mounting system of claim 1, wherein:

the first upper arm, the second upper arm, and the first upper face member are arranged to form a substantially isosceles triangle;

the third upper arm, the second upper arm, and the second upper face member are arranged to form a substantially isosceles triangle;

the first lower arm, the second lower arm, and the first lower face member are arranged to form a substantially isosceles triangle; and the third lower arm, the second lower arm, and the second lower face member are arranged to form a substantially isosceles triangle.

5. The mounting system of claim 1, wherein the first upper arm, the second upper arm, the third upper arm, the first lower arm, the second lower arm, and the third lower arm are all substantially equal in length.

6. The mounting system of claim 1, wherein:

the second upper arm and the first upper face member are joined at a non-orthogonal angle;

the second upper arm and the second upper face member are joined at a non-orthogonal angle;

the second lower arm and the first lower face member are joined at a non-orthogonal angle; and the second lower arm and the second lower face member are joined at a non-orthogonal angle.

7. The mounting system of claim 6, wherein:

the second upper arm and the first upper face member are joined at an acute angle;

the second upper arm and the second upper face member are joined at an acute angle;

the second lower arm and the first lower face member are joined at an acute angle; and the second lower arm and the second lower face member are joined at an acute angle.

8. The mounting system of claim 7, wherein:

the second upper arm and the first upper face member are joined at an acute angle between 60 degrees and 89 degrees;

the second upper arm and the second upper face member are joined at an acute angle between 60 degrees and 89 degrees;

the second lower arm and the first lower face member are joined at an acute angle between 60 degrees and 89 degrees; and the second lower arm and the second lower face member are joined at an acute angle between 60 degrees and 89 degrees.

9. The mounting system of claim 1, wherein the first upper face member and the second upper face member are arranged an angle between 110 degrees and 130 degrees; and the first lower face member and the second lower face member are arranged an angle between 55 degrees and 65 degrees.

10. The mounting system of claim 1, wherein:

the upper pole attachment mount includes an upper proximal portion pivotably attached to an upper distal portion, wherein the first, second, and third upper arms are attached to the upper distal portion of the upper pole attachment mount; and the lower pole attachment mount includes a lower proximal portion pivotably attached to a lower distal portion, wherein the first, second, and third lower arms are attached to the lower distal portion of the lower pole attachment mount.

11. The mounting system of claim 1, comprising:

a first vertical antenna mounting pipe extending between the distal end of the first lower arm and the distal end of the first upper arm;

a second vertical antenna mounting pipe extending between the distal end of the second lower arm and the distal end of the second upper arm; and a third vertical antenna mounting pipe extending between the distal end of the third lower arm and the distal end of the third upper arm.

12. A mounting system for mounting communication equipment to a monopole tower, the system comprising:

a mounting assembly comprising:

a pole attachment mount;

first, second, and third arms, respectively including proximal ends that are respectively couplable to the pole attachment mount, the proximal end of the second arm located between the proximal ends of the first and third arms;

a first face member, coupled to a distal end of the first arm and non-orthogonally, hingedly coupled to a distal end of the second arm; and a second face member, coupled to a distal end of the third arm, and non-orthogonally, hingedly coupled to a distal end of the second arm;

wherein the first face member and the second face member are respectfully arranged at first and second azimuths with respect to the monopole tower, wherein the first and second azimuths have an angular difference between each other ranging between 50° and 70°.

13. The mounting system of claim 12, wherein:

the distal end of the second arm defines a medial break point between the first face member and the second face member; and the medial break point extends distally beyond a first straight line defined between the respective distal ends of the first arm and the third arm.

14. The mounting system of claim 13, wherein:

the first arm, the second arm, and the first face member are arranged to form a substantially isosceles triangle; and the third arm, the second arm, and the second face member are arranged to form a substantially isosceles triangle.

15. The mounting system of claim 13, wherein:

the first arm, the second arm, and the first face member are arranged to form a substantially equilateral triangle; and the third arm, the second arm, and the second face member are arranged to form a substantially equilateral triangle.

16. The mounting system of claim 12, wherein:

the second arm and the first face member are joined at an acute angle; and the second arm and the second face member are joined at an acute angle.

17. The mounting system of claim 12, wherein:

the pole attachment mount includes a proximal portion pivotably attached to a distal portion, wherein the first, second, and third arms are attached to the distal portion of the pole attachment mount.

* * * * *